(12) United States Patent
Kato et al.

(10) Patent No.: US 9,639,148 B2
(45) Date of Patent: May 2, 2017

(54) MOBILE INFORMATION TERMINAL

(71) Applicant: SONY MOBILE COMMUNICATIONS INC., Minato-ku (JP)

(72) Inventors: Kazuhiro Kato, Tokyo (JP); Kouichiro Takashima, Tokyo (JP); Koji Endo, Tokyo (JP); Hiroshi Kubo, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 607 days.

(21) Appl. No.: 13/749,276

(22) Filed: Jan. 24, 2013

(65) Prior Publication Data

US 2013/0222298 A1 Aug. 29, 2013

Related U.S. Application Data

(60) Provisional application No. 61/602,651, filed on Feb. 24, 2012.

(51) Int. Cl.
*G06F 3/0488* (2013.01)
*G06F 3/01* (2006.01)
(Continued)

(52) U.S. Cl.
CPC ............. *G06F 3/01* (2013.01); *G06F 1/1637* (2013.01); *G06F 1/1656* (2013.01); *H04M 1/0266* (2013.01); *G06F 1/1626* (2013.01)

(58) Field of Classification Search
CPC ........... H05K 1/0215; Y10T 29/49117; A61M 5/1723; F24F 11/0086; F24F 2011/0091; G06F 1/1626; G06F 3/044; A61B 1/015
(Continued)

(56) References Cited

U.S. PATENT DOCUMENTS 5,216,411 A * 6/1993 Ashitomi ............... G11B 33/10
341/23
2004/0174667 A1* 9/2004 Kim et al. .................... 361/681
(Continued)

FOREIGN PATENT DOCUMENTS

JP 2010-239323 10/2010
JP 2011-238027 11/2011
WO WO 2007037605 A1 * 4/2007

OTHER PUBLICATIONS

U.S. Appl. No. 13/751,713, filed Jan. 28, 2013, Takashima, et al.

*Primary Examiner* — Kent Chang
*Assistant Examiner* — Sujit Shah
(74) *Attorney, Agent, or Firm* — Oblon, McClelland, Maier & Neustadt, L.L.P.

(57) ABSTRACT

A terminal apparatus includes a display module including a window glass, a touch panel, and a display panel; a display holding frame that secures the display module, the display holding frame having a screw accepting part on a rear surface which is opposite to the display panel; a cabinet case, which encloses the display holding frame, and which has a screw hole corresponding to the screw accepting part of the display holding frame; and a bolt or screw inserted into the screw accepting part of the display holding frame through the screw hole in the cabinet case.

10 Claims, 15 Drawing Sheets

(51) Int. Cl.
*H04M 1/02* (2006.01)
*G06F 1/16* (2006.01)

(58) Field of Classification Search
USPC .......... 345/173–179; 362/97.1, 382; 361/759
See application file for complete search history.

(56) References Cited

U.S. PATENT DOCUMENTS

| | | | |
|---|---|---|---|
| 2007/0165170 A1* | 7/2007 | Fukuda | G02F 1/1333 349/138 |
| 2010/0146766 A1* | 6/2010 | Dabov | G06F 1/1626 29/428 |
| 2010/0156818 A1* | 6/2010 | Burrough et al. | 345/173 |
| 2010/0170542 A1* | 7/2010 | Cosgrove | 134/115 R |
| 2010/0201647 A1* | 8/2010 | Verweg | 345/174 |
| 2010/0245280 A1* | 9/2010 | Choi | H04N 5/64 345/173 |
| 2011/0115744 A1* | 5/2011 | Murayama et al. | 345/174 |
| 2011/0187634 A1* | 8/2011 | Kim | G09G 3/36 345/102 |
| 2011/0260960 A1* | 10/2011 | Jean | H04N 5/64 345/102 |
| 2011/0261032 A1* | 10/2011 | Terashima | G02F 1/167 345/204 |
| 2012/0044668 A1* | 2/2012 | Takeuchi | H05K 1/142 362/97.1 |
| 2012/0133608 A1* | 5/2012 | Chen | 345/174 |
| 2012/0268449 A1* | 10/2012 | Choi | H04N 5/64 345/214 |

* cited by examiner

|   | TERMINAL IN THIS INVENTION (mm) | CONVENTIONAL TERMINAL (mm) |
|---|---|---|
| A | 1.05 | 1.55 |
| B | 0.1 | 0.075 |
| C | 0.6 | 1.43 |
| D | 0.2 | 0.42 |
| E | 1.2 | 1.4 |
| TOTAL | 3.15 | 4.875 |

MOBILE INFORMATION TERMINAL

CROSS REFERENCE TO RELATED APPLICATIONS

This application is related to and claims priority under 35 U.S.C. §119(e) to Provisional Application Ser. No. 61/602,651, filed Feb. 24, 2012, the contents of which are hereby incorporated herein by reference.

BACKGROUND

1. Field

The present specification relates to a mobile information terminal having a touch panel that can detect the touch or proximity of an external conductor such as a finger of a user by detecting a change in, for example, capacitance or the like and also having a display panel that can display various types of information.

2. Description of the Related Art

FIGS. 15 and 16 schematically illustrate the partial cross sectional structure of a conventional mobile information terminal having a touch panel 103 that can detect the touch or proximity of an external conductor such as a finger of a user by detecting a change in capacitance or the like and also having a display panel 104 that can display various types of information. FIG. 15 illustrates a state in which individual components have been assembled, and FIG. 16 is an exploded view when individual components are to be assembled. The individual components in FIGS. 15 and 16 are hatched to distinguish them on the drawings and not to represent their materials.

As illustrated in FIGS. 15 and 16, the conventional mobile information terminal has a display module formed by interposing a transparent touch panel 103 between a sheet of transparent window glass 102 and a display panel 104.

When incorporated into the cabinet case of the mobile information terminal, the display module is placed so that the window glass 102 is disposed at the outermost position and the display panel 104 is disposed on the inner side of the case. In the description that follows, out of the two main planes of the window glass 102, the main plane disposed on the outer side of the cabinet case when the window display module is incorporated into the cabinet case will be appropriately referred to as the outer main plane and the main plane disposed on the inner side of the cabinet case will be appropriately referred to as the inner main plane.

The size of the window glass 102 in its main plane direction is larger than the sizes of the main planes of the display panel 104 in their main plane directions. The display panel 104 and window glass 102 are placed so that the central positions of their main planes substantially match. Therefore, the outer circumferential part (referred to below as the window inner surface-side outer circumferential part 102a) of the inner main plane of the window glass 102 protrudes outward from the outer circumferential part of the display panel 104. The cabinet case of the mobile information terminal is formed with a front case 101 and a rear case 120 illustrated in FIGS. 15 and 16. The display module is incorporated into the front case 101. A circuit board 106, on which electronic circuits and the like are mounted, a battery, and the like are incorporated into the rear case 120. The front case 101 has an auxiliary plate to prevent the display module from warping due to, for example, an external force. The auxiliary plate is shaped like a plate made of, for example, stainless steel, and formed integrally with a resin wall, which is part of the front case 101.

When the front case 101, into which the display module has been incorporated, and the rear case 120, into which the circuit board 106 and the like have been incorporated, are assembled together, the mobile information terminal becomes a terminal in a substantially rectangular plate shape as illustrated in, for example, FIG. 17.

The front case 101 has a waterproof packing accepting part 101c near its outer circumferential walls that strike against the rear case 120 when the front case 101 and rear case 120 are assembled together. Similarly, the rear case 120 has a waterproof packing accepting part 120c near its outer circumferential walls that strike against the front case 101 when the front case 101 and rear case 120 are assembled together. The waterproof packing accepting parts 101c and 120c interpose a waterproof packing 121 therebetween and bring the waterproof packing 121 into tight contact with the wall surfaces of the two cases. Since the mobile information terminal is assembled with the waterproof packing 121 interposed between the waterproof packing accepting part 101c and the waterproof packing accepting part 120c in this way, it is possible to prevent water, dust, and the like from entering the interior of the mobile information terminal from a clearance formed when the front case 101 and rear case 120 are assembled together. FIG. 17 schematically illustrates the external appearance of the conventional mobile information terminal in a state in which the front case 101, into which the display module has been incorporated, and the rear case 120, into which the circuit board 106 and the like have been incorporated, are assembled together as viewed from the front side (on the same side as the display surface of the display panel) of the mobile information terminal. That is, as illustrated in FIG. 17, the outermost circumferential part of the mobile information terminal is the front-side outer circumferential edge 101b of the front case 101 and the window glass 102 is placed inside the front-side outer circumferential edge 101b. The mobile information terminal is arranged so that a display on the display panel 104 is visible through the transparent window glass 102 and transparent touch panel 103.

In the conventional mobile information terminal, the front case 101 has an opening on the side on which the display module is incorporated, as illustrated in FIGS. 15 and 16; a step (referred to below as a window glass mounting part 101a), on which the inner surface-side outer circumferential part 102a of the window glass 102 is rested when the display module is incorporated, is formed in the opening.

As for the conventional mobile information terminal, the entire circumferences of the window glass mounting part 101a and the inner surface-side outer circumferential part 102a of the window glass 102 are bonded together, for example, by the use of a double-sided adhesive tape 107. That is, as for the conventional mobile information terminal, the display module is secured to the front case 101 by bonding the entire circumferences of the window glass mounting part 101a and the inner surface-side outer circumferential part 102a of the window glass 102 together by the use of the double-sided adhesive tape 107.

In addition, Japanese Unexamined Patent Application Publication No. 2011-238027 (PTL 1), for example, discloses a mobile programmable display unit that can suppress its display panel, circuit board, and touch panel from being damaged due to an impact caused when the mobile information terminal drops or is struck against a structure or to deformation of its cabinet. The mobile programmable display unit includes a liquid crystal panel, a touch panel, a front case, a panel shock absorbing material, a panel holder, and a holder shock absorbing material. The front case has an opening. The panel shock absorbing material is placed so as to enclose the periphery of the liquid crystal panel, the cross section of which has a shape in which the ends of the liquid crystal panel are interposed; the panel shock absorbing material is supported with its front surface and side surfaces abutting the inner surfaces of the panel holder. The panel holder, formed with a bottom frame and side walls, accommodates the liquid crystal panel and the panel shock absorbing material from the rear surface side, the circumference edge of the touch panel being secured to the front of the bottom frame. In the mobile programmable display unit, the holder shock absorbing material is interposed between the front of the bottom frame and the inner surfaces of the front case.

Japanese Unexamined Patent Application Publication No. 2010-239323 (PTL 2), for example, discloses a mobile terminal apparatus that suppresses an increase in the number of parts and can prevent parts from being damaged. The mobile terminal apparatus is formed with a liquid crystal panel, a touch panel, a liquid crystal module, a circuit board, a liquid crystal flexible cable, and two spacers. The liquid crystal panel displays various images. The touch panel, which is attached to the rear surface of the liquid crystal panel, detects a contact on the liquid crystal panel. The liquid crystal module outputs an image to be displayed on the liquid crystal panel. The circuit board includes a control circuit; the circuit board is used to have the liquid crystal module output an image and to carry out an appropriate process according to the position of the contact on the touch panel. The liquid crystal flexible cable is a flexible cable made of a flexible material; it mutually connects the control circuit on the circuit board and the liquid crystal module. One of the two spacers is formed with an insulating body; it is inserted into the clearance between the circuit board and the liquid crystal flexible cable. The other spacer is stuck to a movable cabinet at a position at which the liquid crystal flexible cable is interposed between the one spacer and the other spacer. In this mobile information terminal, the rear surface of the liquid crystal panel is stuck to the movable cabinet in the vicinity of the outer circumference of the liquid crystal panel.

CITATION LIST

Patent Literature

[PTL 1] Japanese Unexamined Patent Application Publication No. 2011-238027 (FIG. 4)
[PTL 2] Japanese Unexamined Patent Application Publication No. 2010-239323 (FIG. 3)

In the conventional mobile information terminal described above, the double-sided adhesive tape 107 secures the display module, which has a certain weight, to the front case 101; even if, for example, the mobile information terminal drops on a floor or the like, the double-sided adhesive tape 107 enables the mobile information terminal to withstand the impact force due to the drop; the double-sided adhesive tape 107 also has a reasonable bonding width to prevent dust, water, and other foreign matter from entering the interior of the front case 101.

The conventional mobile information terminals must also have margins used at the time of incorporating the display module into the front case 101. To protect the window glass 102 and the like from an impact force applied to, for example, a side wall surface of the front case 101, the wall at the front-side outer circumferential edge 101b of the front case 101 must also have a certain thickness.

The conventional mobile information terminal requires that the thickness, indicated by A in FIG. 15, of the wall of the front-side outer circumference edge 102b of the front case 101 be, for example, about 1.55 mm. As the margins used at the time of incorporating the display module into the front case 101, a clearance, as indicated by B in FIG. 15, between the window glass 102 and the front case 101 needs to be, for example, about 0.075 mm wide and a clearance, as indicated by D in FIG. 15, between the display panel 104 and window glass 102 needs to be, for example, about 0.42 mm wide. Since the conventional mobile information terminal uses the double-sided adhesive tape 107 having a bonding width (tape width) enough to obtain a sufficient bonding strength, the width of the window glass mounting part 101a of the front case 101 is, for example, about 1.43 mm as indicated by C in FIG. 15. In addition, as for the conventional mobile information terminal, the width from an effective display area, as indicated by E in FIG. 15, in which images and the like are actually displayed on the display panel 104, to the outermost circumferential part of the display panel 104 is, for example, about 1.4 mm.

In the case of the currently available mobile information terminal, therefore, an outer circumferential width arw, as illustrated in FIG. 17, from the outermost circumferential edge of the front case 101 to the outermost circumferential edge of the effective display area aca of the display panel 104 must be, for example, 4,875 mm, which is the sum of the widths indicated by A to E in FIG. 15. In the description that follows, the outer circumferential width arw from the outermost circumferential edge of the window glass 102 to the outermost circumferential edge of the effective display area aca of the display panel 104 will be represented as the terminal frame width arw.

The display panels of recent mobile information terminals are becoming increasingly large and the front-side projection sizes of the mobile information terminals are becoming large accordingly. That is, the projection size of a conventional mobile information terminal has been often determined depending on the area occupied by the circuit board, the battery, and other devices, but the projection size of a recent mobile information terminal is determined by the display size of the display panel.

In the future, it is desired that mobile information terminals maintain superior portability and superior maneuverability and also have the advantage of being able to increase the amount of displayed information, which is obtained by enlarging the screen of the display panel. However, the conventional mobile information terminal described above requires the terminal frame width arw to be, for example, about a little less than 5 mm; if an attempt is made to prevent the outer size of the mobile information terminal from becoming large to maintain the portability and maneuverability, it becomes hard to increase the amount of displayed information by enlarging the screen of the display panel; conversely, if the mobile information terminal is aimed at enlarging the screen, the resulting large outer size of the mobile information terminal lowers the portability and maneuverability.

In view of these situations, the inventors recognize that a mobile information terminal having a touch panel and a display panel needs to have a large screen to increase the amount of displayed information and also maintain superior portability and maneuverability.

BRIEF SUMMARY

A terminal apparatus according to an embodiment includes a display module including a window glass, a touch panel, and a display panel; a display holding frame that secures the display module, the display holding frame having a screw accepting part on a rear surface which is opposite to the display panel; a cabinet case, which encloses the display holding frame, and which has a screw hole corresponding to the screw accepting part of the display holding frame; and a bolt or screw inserted into the screw accepting part of the display holding frame through the screw hole in the cabinet case.

More specifically, a mobile information terminal in an embodiment is structured with a display module part, a display holding frame part, and a cabinet case part. The display module part is formed by laminating a sheet of window glass, a touch panel, and a display panel. The display holding frame part holds and secures the display module part from the rear surface of the display module part, the rear surface being opposite to the display surface of the display panel. The display holding frame part has screw accepting parts on its rear surface side opposite to the display panel. The cabinet case part, which internally accumulates the display holding frame part, has screw holes corresponding to the screw accepting parts of the display holding frame part. The mobile information terminal in the embodiment is formed by screwing bolts into the screw accepting parts of the display holding frame part through the screw holes in the cabinet case part to secure the display holding frame part, to which the display module part has been secured, to the cabinet case part.

That is, according to the embodiment, since the display module part is secured to the display holding frame part and the display holding frame part is secured to the cabinet case part with bolts, the double-sided adhesive tape, which has been used to secure the display module part, becomes unnecessary.

In the mobile information terminal in the embodiment, the cabinet case part has a frame outer circumference placing part on which the outer circumference of the rear surface of the display holding frame part is placed. The mobile information terminal also has a waterproof sheet that has a shape substantially matching a prescribed shape formed by the outer circumferential part of the rear surface of the display holding frame part and the frame outer circumference placing part of the cabinet case part, the waterproof sheet having impermeability to at least moisture. The waterproof sheet is interposed between the outer circumferential part of the rear surface of the display holding frame part and the frame outer circumference placing part of the cabinet case part.

That is, according to the embodiment, since the waterproof sheet is interposed between the outer circumferential part of the rear surface of the display holding frame part and the frame outer circumference placing part of the cabinet case part, penetration of water and the like into the interior of the cabinet case part is prevented.

In the mobile information terminal in the embodiment, together with the display holding frame part, the cabinet case part internally accommodates the circuit board. The display holding frame part is made of a metal material, and has walls formed on the rear surface, the walls enclosing and covering the electronic part on the circuit board.

That is, according to the embodiment, since the electronic part on the circuit board is enclosed by the walls made of a metal material on the display holding frame part, electromagnetic noise can be shut off.

According to the embodiment of the present invention, since the display module part is secured to the display holding frame part and the display holding frame part is then secured to the cabinet case part with bolts, the double-sided adhesive tape, which has been used to secure the display module part, becomes unnecessary. Accordingly, the outer circumferential width from the outermost circumferential edge of the cabinet case part to the outermost circumferential edge of the effective display area of the display panel can be reduced as much as possible but an adequate effective display area can be obtained; in addition, the amount of displayed information can be increased by the use of a large screen, but superior portability and maneuverability can be maintained.

BRIEF DESCRIPTION OF THE DRAWINGS

FIG. 10 is a schematic cross sectional view of the mobile information terminal in the embodiment of the present invention, which implements an electromagnetic wave shield function and a heat dissipating function as other functions of the display holding frame and the like.

DETAILED DESCRIPTION

An advanced mobile information terminal will be described below as an embodiment of the present invention with reference to the drawings, the terminal having a touch panel that can detect the touch or proximity of an external conductor such as a finger of a user by detecting a change in, for example, capacitance or the like and also having a display panel that can display various types of information.

[Structure of the Mobile Information Terminal in this Embodiment]

Figure 1:
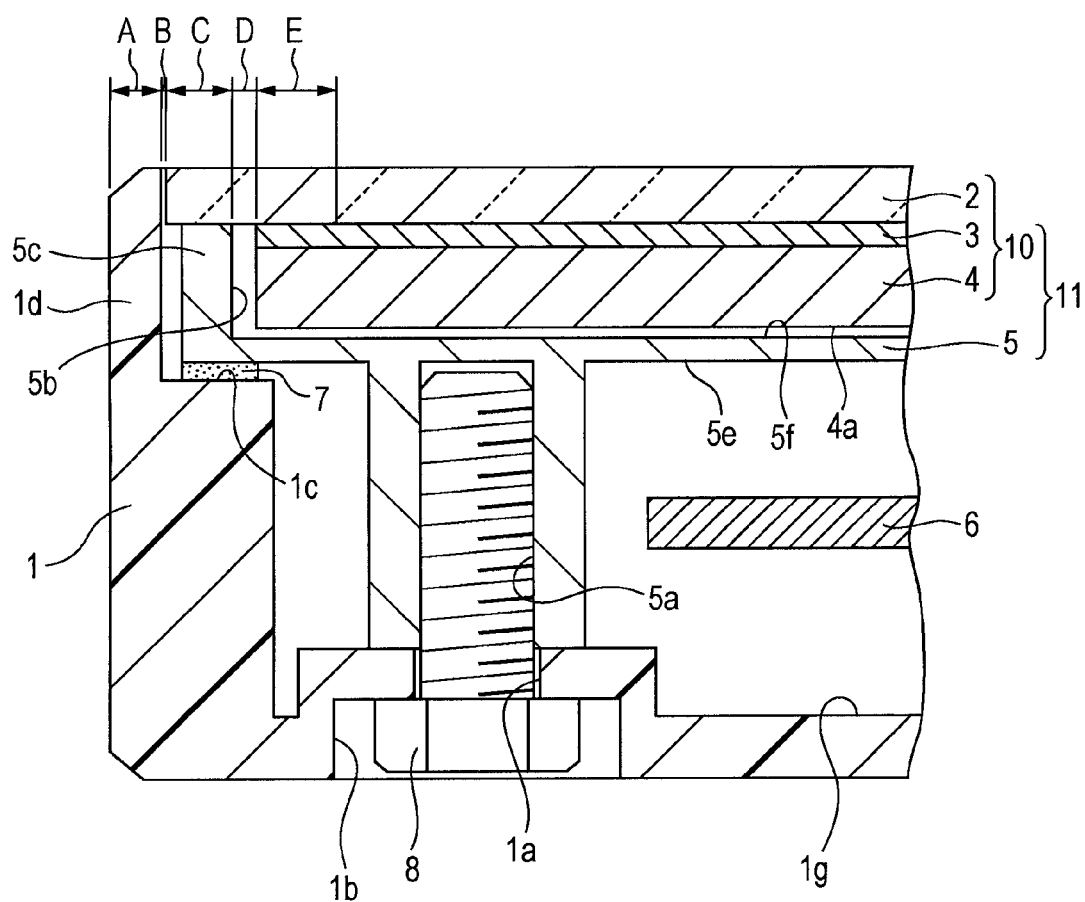
FIG. 1 is a schematic cross sectional view of a mobile information terminal in an embodiment of the present invention.
Figure 2:
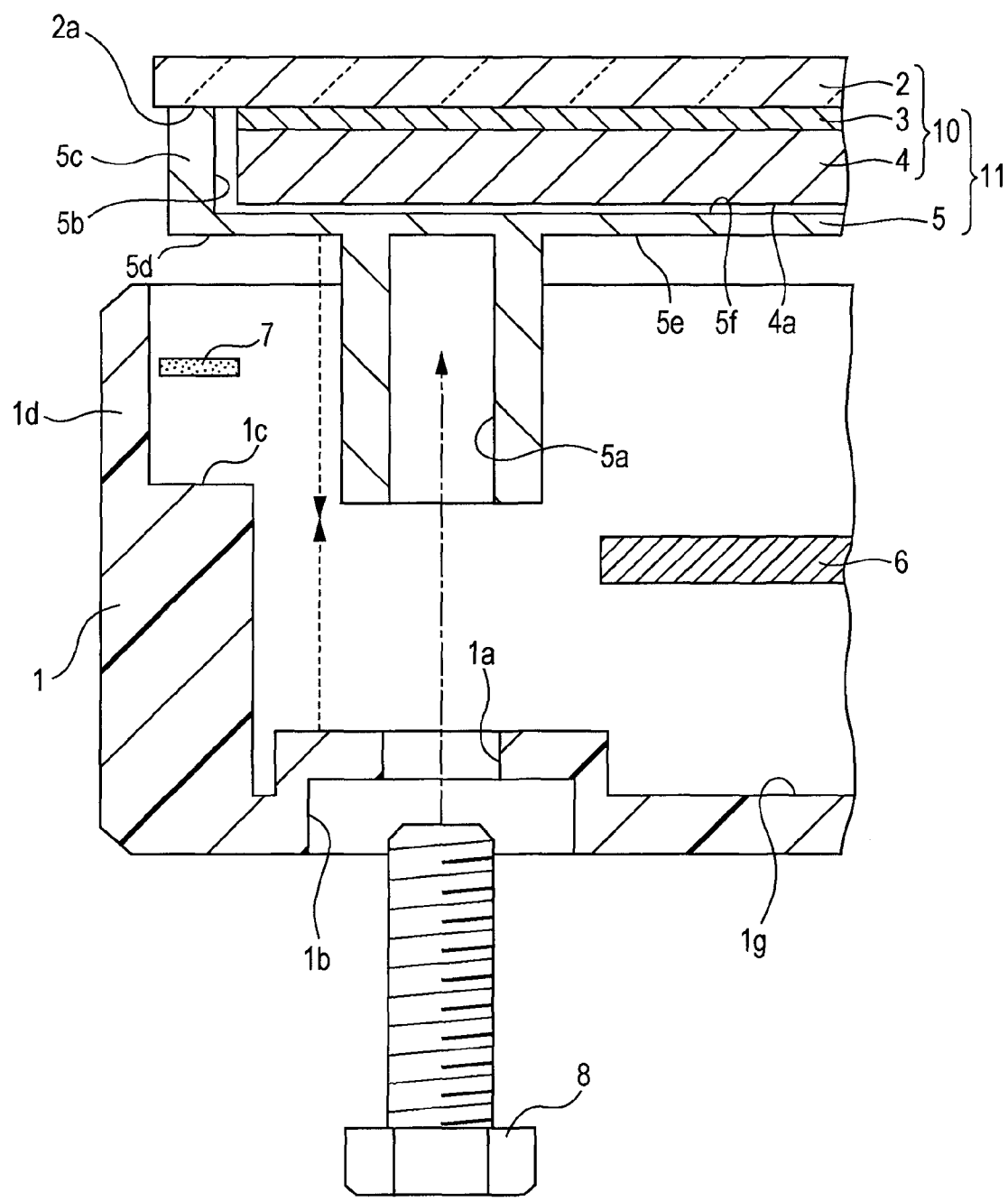
FIG. 2 is an exploded view when the individual components of the mobile information terminal in the embodiment of the present invention are assembled.
Figure 3:
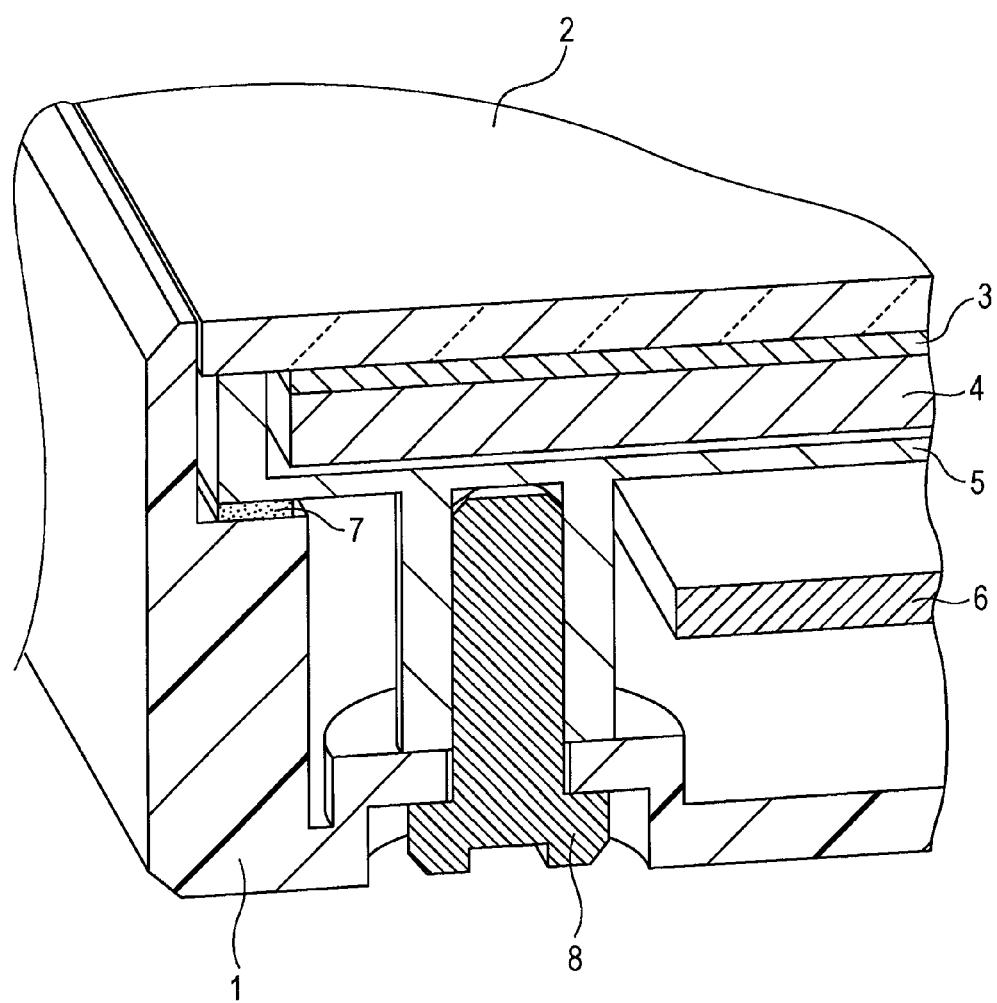
FIG. 3 is a perspective view that illustrates a partial cross sectional structure when the individual components of the mobile information terminal in the embodiment of the present invention have been assembled.

FIGS. 1 to 3 schematically illustrate the partial cross sectional structure of a mobile information terminal in this embodiment that has a touch panel 3 that can detect the touch or proximity of an external conductor such as a finger of a user by detecting a change in, for example, capacitance or the like and also has a display panel 4 that can display various types of information. FIG. 1 is a cross sectional view in a state in which individual components have been assembled, FIG. 2 is an exploded view when the individual components are assembled, and FIG. 3 is a perspective view including a partial cross sectional structure when the individual components have been assembled. The individual components in FIGS. 1 to 3 are hatched to distinguish them on the drawings and not to represent their materials. This is also true for the subsequent cross sectional views.

As illustrated in FIGS. 1 to 3, the mobile information terminal in this embodiment has a display module 10 formed by interposing a transparent touch panel 3 in a rectangular plate shape between a sheet of transparent window glass 2 in a rectangular plate shape and a display panel 4 in a rectangular plate shape.

When incorporated into the cabinet case (referred to below simply as the case 1) of the mobile information terminal in this embodiment, the display module 10 is placed so that the window glass 2 is disposed at the outermost position and the display panel 4 is disposed on the inner side of the case 1. In the description that follows, out of the two main planes of the window glass 2, the main plane disposed on the outer side when the display module 10 is incorporated into the case 1 will be appropriately referred to as the window outside main plane and the main plane disposed on the inner side of the case 1 will be appropriately referred to as the window inside main plane. In the description that follows, out of the two main planes of the display panel 4, the main plane disposed on the inner side of the case 1 when the display module 10 is incorporated into the case 1 will be appropriately referred to as the panel inside main plane 4a.

The size of the window glass 2 in its main plane direction is larger than the sizes of the main planes of the display panel 4 in their main plane directions. The display panel 4 and window glass 2 are placed so that the central positions of their main planes substantially match. Therefore, the outer circumferential part (referred to below as the window inner surface-side outer circumferential part 2a) of the window inside main plane of the window glass 2 protrudes outward from the outer circumferential part of the display panel 4.

The mobile information terminal in this embodiment also has a frame (referred to below as a display holding frame 5) configured to hold the display module 10 from the same side as the panel inside main plane 4a of the display panel 4. In this embodiment, the display holding frame 5 is formed by performing so-called die-casting molding using, for example, magnesium, aluminum, or another metal.

The display holding frame 5 is shaped so as to be slightly larger the planar shapes of the display panel 4 and touch panel 3 and have a depression (referred to below as a display panel accepting part 5b), the depth of which is extremely slightly smaller than the total height of the display panel 4 and touch panel 3 in their lamination direction. That is, in other words, the display panel accepting part 5b encloses the outer circumferential parts of the display panel 4 and touch panel 3 when the display module 10 is fitted from the panel inside plane 4a of the display panel 4; the display panel accepting part 5b has walls (referred to below as frame side walls 5c), the height of which is extremely slightly lower than the total height of the display panel 4 and touch panel 3 in their lamination direction, and also has a bottom surface (referred to below as a frame bottom surface 5f) facing the panel inside plane 4a of the display panel 4.

When, in this embodiment, the display panel 4 of the display module 10 is fitted into the display panel accepting part 5b, the panel inside main plane 4a of the display panel 4 is bonded to the frame bottom surface 5f of the display panel accepting part 5b with, for example, an adhesive or a double-sided adhesive sheet. Thus, the display module 10 is secured to the display holding frame 5. In this embodiment, the structure in which the display module 10 is secured to the display holding frame 5 is handled as a single unit. In the description that follows, the unit will be appropriately referred to as the display unit 11.

The display holding frame 5 has screw accepting parts (referred to below as internally threaded parts 5a) on a rear surface (referred to below as a frame rear surface 5e) opposite to the frame bottom surface 5f of the display panel accepting part 5b, the internally threaded parts 5a enabling the display holding frame 5 to be secured (screwed) to the case 1 with, for example, bolts 8.

The case 1 in this embodiment has through-holes 1a in its inner bottom surface (referred to below as a case bottom surface 1g), the inner diameter of the through-hole 1a being larger than the maximum outer diameter of the threaded part (referred to below as the externally threaded part) of the bolt 8 and being smaller than the diameter of the bolt head, and also has a countersunk part 1b, the depth of which is slightly larger than the height of the bolt head.

In the mobile information terminal in this embodiment, the externally threaded part of the bolt 8 is inserted from the countersunk part 1b of the case 1 and is then screwed into the internally threaded part 5a of the display holding frame 5 through the through-hole 1a. Thus, the display holding frame 5 is secured to the case 1 with the bolts 8. That is, the display unit 11 is placed in a state in which it is secured to the case 1 in this embodiment with the bolts 8. As for the mobile information terminal in this embodiment, it is also possible to remove the display unit 11 easily from the case 1 by removing the bolts 8. In other words, the mobile information terminal in this embodiment is structured so that the display unit 11 can be easily replaced.

Although this embodiment uses an example in which the display unit 11 is secured to the case 1, which is an external cabinet of the mobile information terminal, the mobile information terminal may be structured so that the display unit 11 is secured to an internal chassis or the like with the bolts 8, the internal chassis being formed integrally with or screwed to the case 1, for example.

The case 1 in this embodiment has a step at a position that faces an outer circumferential part (referred to below as a frame rear surface-side outer circumferential part 5d) on the frame rear surface 5e of the display holding frame 5 when the display unit 11 is secured. The step is a part (referred to bellow as a frame outer circumference placing part 1c) on which the frame rear surface-side outer circumferential part 5d of the display holding frame 5 is placed. That is, in other words, the frame outer circumference placing part 1c is a step that has a rectangular ring shape facing the frame rear surface-side outer circumferential part 5d of the display holding frame 5.

The mobile information terminal in this embodiment further has a waterproof sheet 7 at a place where the waterproof sheet 7 is interposed between the frame rear surface-side outer circumferential part 5d of the display holding frame 5 and the frame outer circumference placing part 1c of the case 1 when the display unit 11 is secured to the case 1. The waterproof sheet 7 has as rectangular ring shape corresponding to the frame rear surface-side outer circumferential part 5d of the display holding frame 5 and the frame outer circumference placing part 1c of the case 1; the waterproof sheet 7 is formed with, for example, a silicone rubber sheet or another material that does not allow moisture to penetrate. That is, as for the mobile information terminal in this embodiment, the waterproof sheet 7 is interposed between the frame rear surface-side outer circumferential part 5d of the display holding frame 5 and the frame outer circumference placing part 1c of the case 1 when the display unit 11 is secured to the case 1; when the waterproof sheet 7 is brought into tight contact with the entire circumferences of the frame rear surface-side outer circumferential part 5d and frame outer circumference placing part 1c, it becomes possible to prevent water and dust from entering the interior of the case 1. The waterproof sheet 7 may have viscosity and adhesiveness as well as a waterproof property.

In the mobile information terminal in this embodiment, the frame outer circumference placing part 1c of the case 1 has walls (referred to below as case front-side outer circumferential walls id), which enclose the outer circumference of the display unit 11 when the display unit 11 is incorporated, the height of the case front-side outer circumferential wall 1d being substantially the same as the height from the frame rear surface 5e of the display holding frame 5 to the window outside main plane of the window glass 2. Accordingly, as for the mobile information terminal in this embodiment, the height at the top of the case front-side outer circumferential walls id substantially matches the height of the window outside main plane of the window glass 2 of the display unit 11 when the display unit 11 is secured to the case 1. In addition, in this embodiment, due to the existence of the case front-side outer circumferential walls id, the window glass 2 is protected from, for example, an impact from a side surface direction.

The mobile information terminal in this embodiment is manufactured by incorporating the display unit 11, the circuit board 6 on which various types of electronic parts are mounted, and a battery pack into the case 1. When the display unit 11 and the like are incorporated into the case 1, the mobile information terminal in this embodiment becomes a terminal having a substantially rectangular plate shape as illustrated, for example, in FIG. 4.

As for the mobile information terminal in this embodiment, the display unit 11 is formed by, for example, boding the panel inside main plane 4a of the display panel 4 and the display panel accepting part 5b of the display holding frame 5 together as described above and the display unit 11 is secured to the case 1 with the bolts 8, so the display module 10 having a certain weight can be firmly secured to the case 1.

Since the mobile information terminal in this embodiment is firmly secured to the case 1 in a state in which the display module 10 is enclosed by the display holding frame 5, even if the terminal drops, for example, on a floor, the terminal can withstand an impact force generated by the drop or the like and can protect the display module 10.

Furthermore, as for the mobile information terminal in this embodiment, since the waterproof sheet 7 is disposed between the frame rear surface-side outer circumferential part 5d of the display holding frame 5 and the frame outer circumference placing part 1c of the case 1, it is possible to prevent water, dust, and the like from entering the interior of the case 1.

As for the mobile information terminal in this embodiment, since a structure is employed in which the display unit 11 that uses the rugged display holding frame 5 as described above to enclose the display module 10 is firmly secured to the case 1 with the bolts 8, a wide double-sided adhesive tape does not need to be used as in the conventional mobile information terminal. Similarly, since the mobile information terminal in this embodiment uses the firmly securing method described above and the case 1 has the case front-side outer circumferential walls id, it is possible to protect the window glass 2 and the like, for example, from an external impact applied toward a side surface of the case 1. As a result, the side walls of the case 1 can be made thinner as compared with the conventional mobile information terminal.

Since the mobile information terminal in this embodiment has the structure as described above, as an example, the thickness, indicated by A in FIG. 1, of the case front-side outer circumferential wall 1d may be, for example, about 1.05 mm. The width of the clearance required as a margin when the display unit 11 is incorporated into the case 1 is the width of the clearance from the end of the side surface of the window glass 2 to the inner wall surface of the case front-side outer circumferential wall 1d, as indicated by B in FIG. 1, the value of the width being, for example, about 0.1 mm. The width of the clearance required as a margin when the display module 10 is incorporated into the display holding frame 5 is the width of the clearance from the end of the side surface of the display panel 4 to the inner wall surface of the frame side wall 5c of the display holding frame 5, as indicated by D in FIG. 1, the value of the width being, for example, about 0.2 mm. As for the mobile information terminal in this embodiment, the thickness of the inner wall surface of the frame side wall 5c of the display holding frame 5, as indicated by C in FIG. 1, is, for example, about 0.6 mm. Furthermore, as for the mobile information terminal in this embodiment, the width from the effective display area in which images and the like are actually displayed on the display panel 4 to the outermost circumferential part of the display panel 4, as indicated by E in FIG. 1, is, for example, about 1.2 mm.

Figures 4, 5:
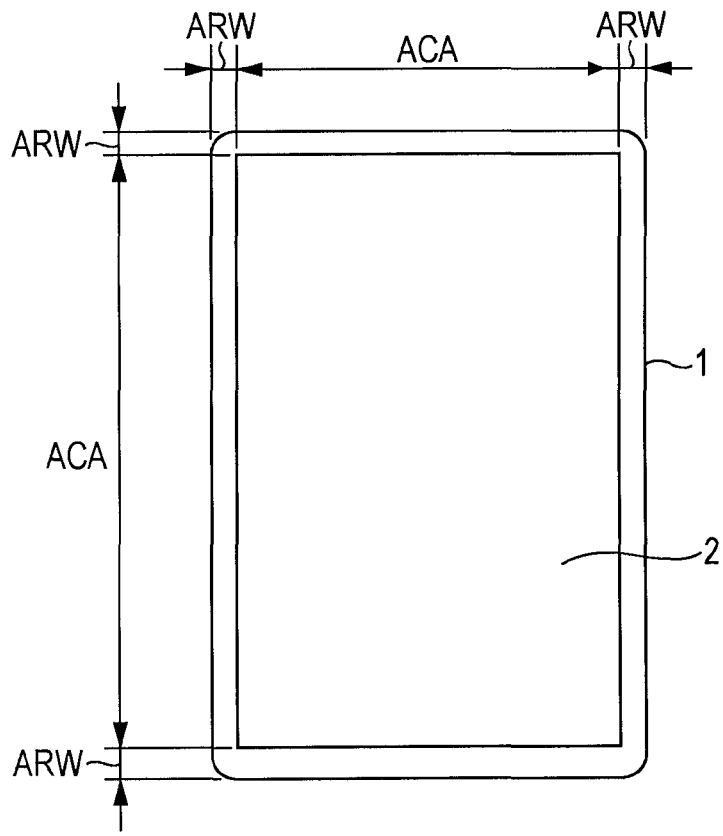
FIG. 4 is a front view of the mobile information terminal, in the embodiment of the present invention, which is manufactured by incorporating a display unit into a case.
FIG. 5 is a table that indicates the values of the widths A to E, in FIG. 1, of the mobile information terminal in the embodiment of the present invention and their total and also indicates that the values of the widths A to E, in FIG. 15, of a conventional mobile information terminal and their total.

As for the mobile information terminal in this embodiment, therefore, an outer circumferential width ARW, as illustrated in FIG. 4, from the outermost circumferential edge of the case 1 to the outermost circumferential edge of the effective display area ACA of the display panel 4 is, for example about 3.15 mm, which is the sum of the widths indicated by A to E in FIG. 1. In the description that follows, the outer circumferential width ARW from the outermost circumferential edge of the window glass 2 to the outermost circumferential edge of the effective display area ACA of the display panel 4 will be represented as the terminal frame width ARW.

Figure 15:
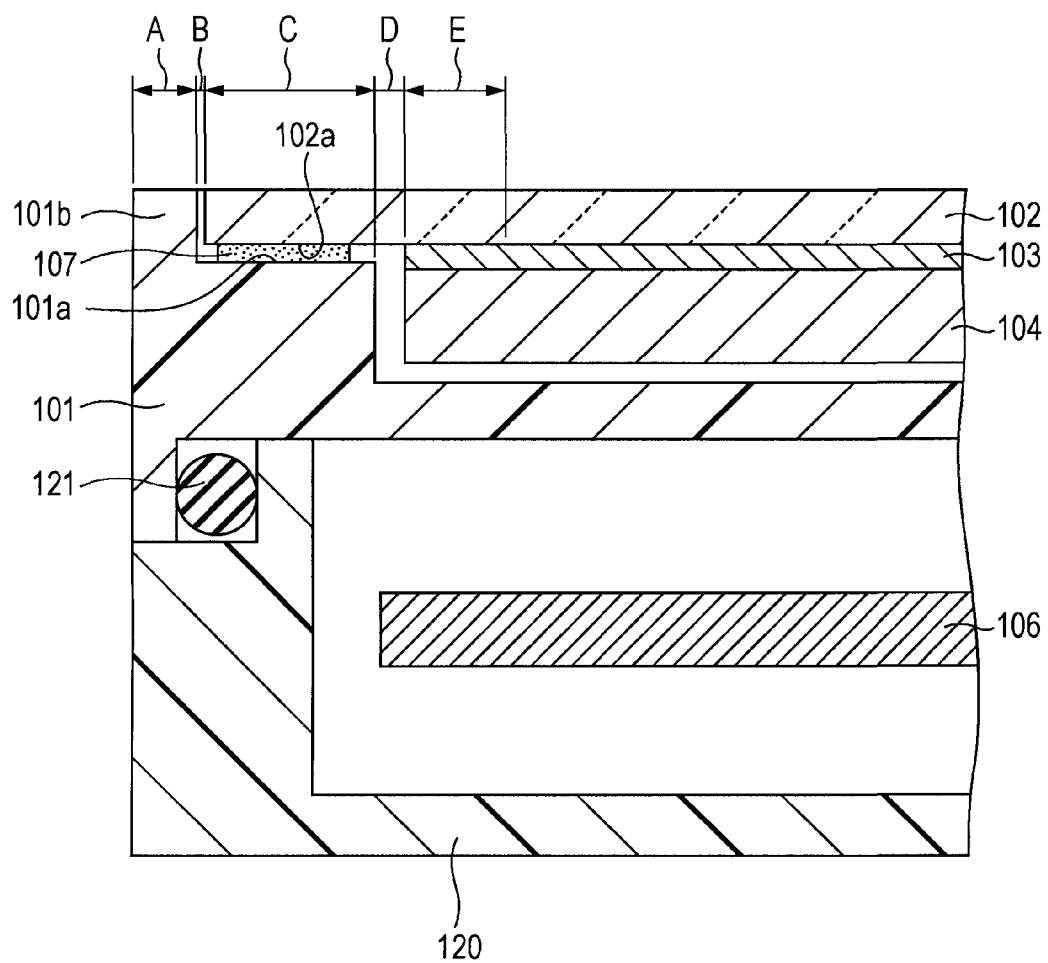
FIG. 15 is a schematic cross sectional view of the conventional mobile information terminal.
Figure 16:
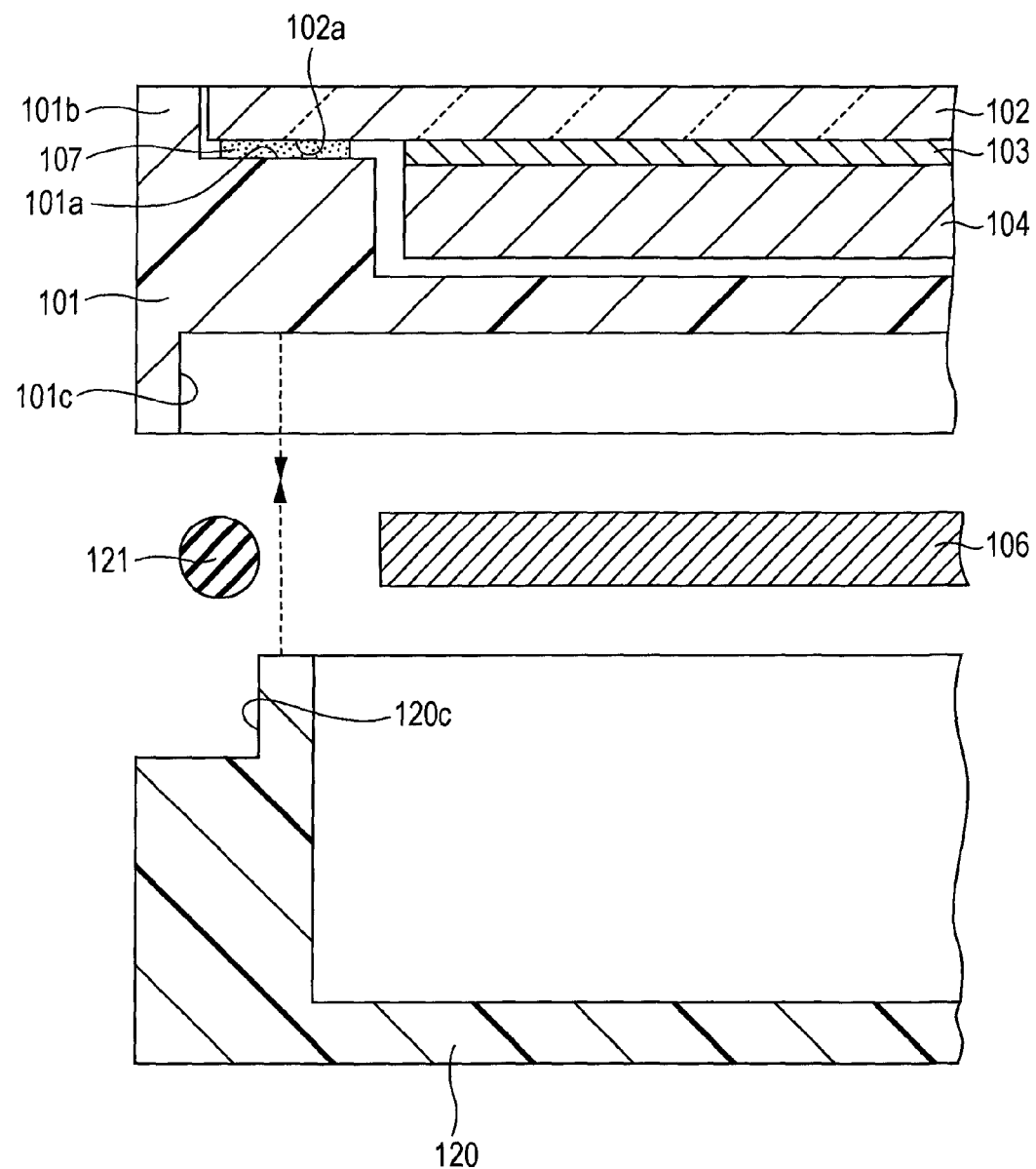
FIG. 16 is an exploded view when the individual components of the conventional mobile information terminal are assembled.
Figure 17:
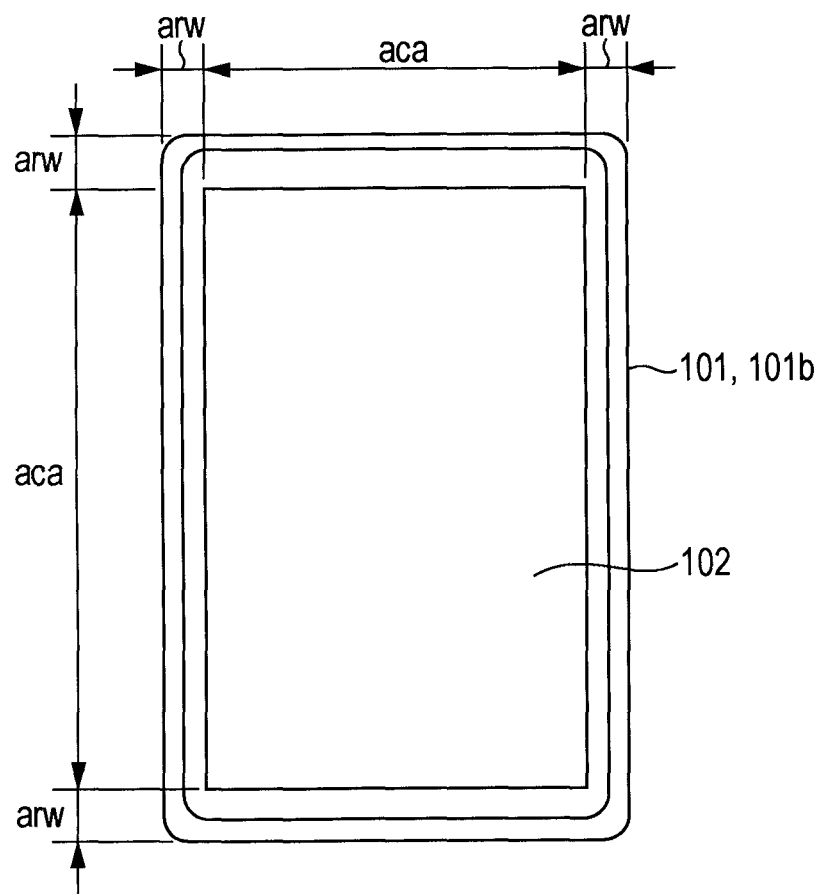
FIG. 17 is a front view of the conventional mobile information terminal, which is manufactured by incorporating a display module into a case.

FIG. 5 is a table that indicates the values of the widths A to E, in FIG. 1, of the mobile information terminal in this embodiment and their total and also indicates that the values of the widths A to E, in FIG. 15, of the conventional mobile information terminal described above and their total.

As seen from the values in the table in FIG. 5, the terminal frame width ARW of the mobile information terminal in this embodiment is about 3.15 mm; by comparison, the terminal frame width arw of the conventional mobile information terminal described above is about 4.875 mm. That is, the mobile information terminal in this embodiment can have a smaller terminal frame width ARW than the conventional mobile information terminal. Therefore, the mobile information terminal in this embodiment can increase the amount of displayed information by the use of a large screen, and can also maintain superior portability and maneuverability because the front-side projection size of the mobile information terminal is not enlarged.

[Example of Assembling the Mobile Information Terminal in this Embodiment]

FIGS. 6 to 9 illustrate an example of assembling the mobile information terminal in this embodiment described above.

Figure 6:
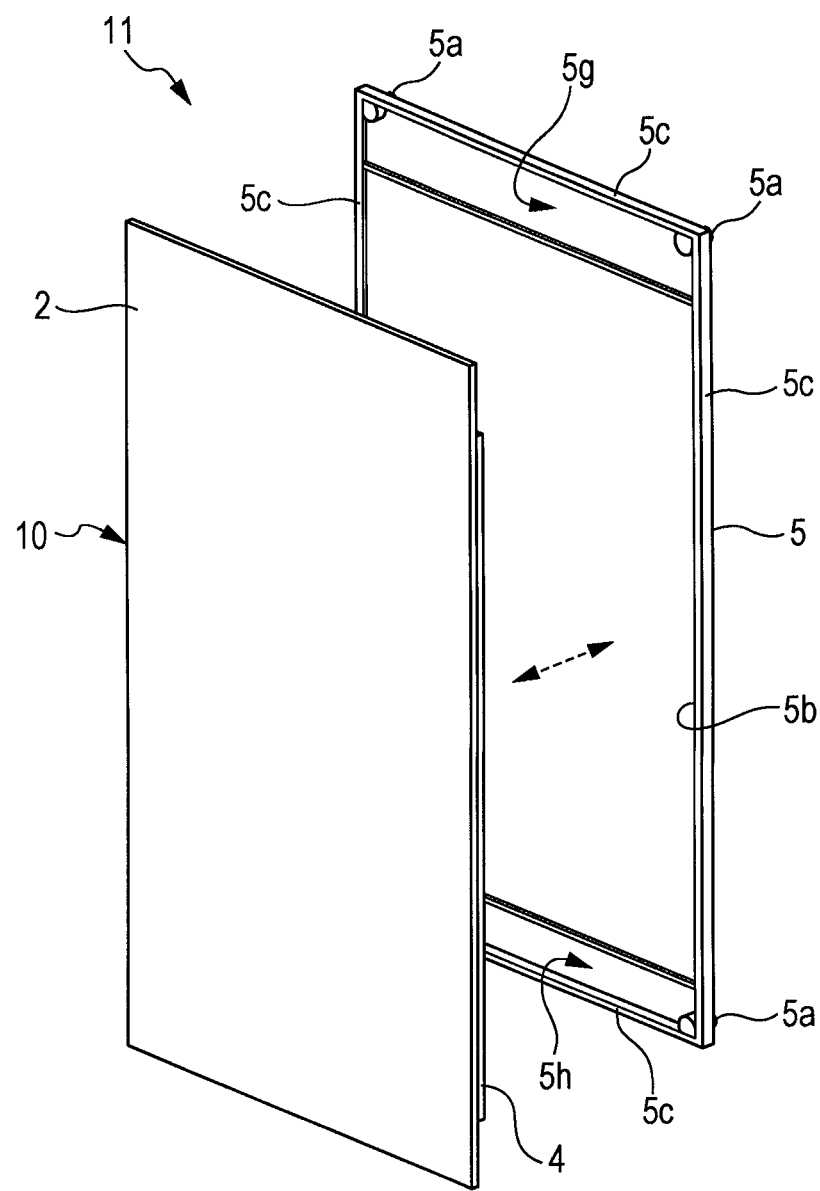
FIG. 6 is a schematic exploded perspective view of a display module and a display holding frame included in the mobile information terminal in the embodiment of the present invention.
Figure 7:
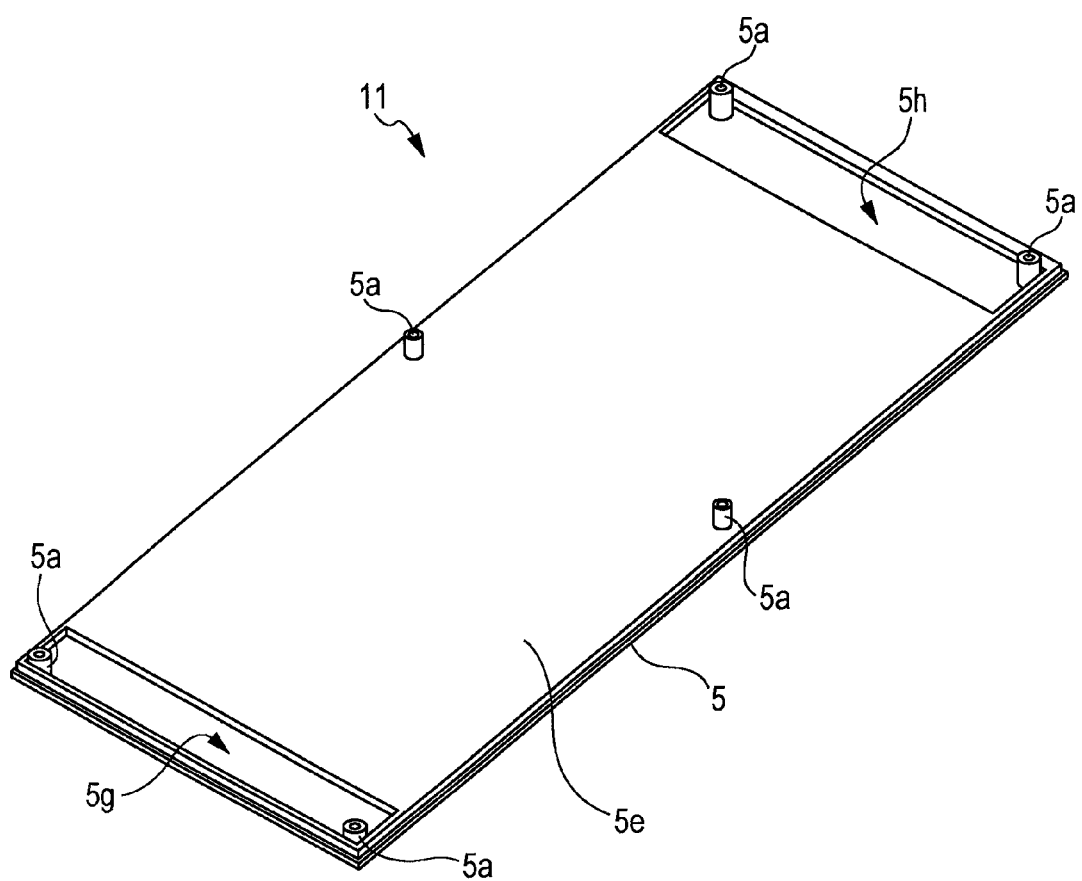
FIG. 7 is a perspective view of a display unit in a state in which the display module has been incorporated into the display holding frame, which is part of the mobile information terminal in the embodiment of the present invention, as viewed from the frame rear surface of the display holding frame.

The display unit 11 of the mobile information terminal in this embodiment is formed by incorporating the display module 10, which is formed by bonding the window glass 2, touch panel 3, and display panel 4 described above together, into the display holding frame 5, as illustrated in FIG. 6. FIG. 7 is a perspective view of the display unit 11 in a state in which the display module 10 has been incorporated into the display holding frame 5, as viewed from the frame rear surface 5e of the display holding frame 5.

As indicated by the example in FIGS. 6 and 7, the display holding frame 5 has internally threaded parts 5a at a total of six places, which are four places near the four corners of the frame rear surface 5e and two places substantially at the center near the two longer edges of the display holding frame 5, for example.

The display holding frame 5 in this embodiment also has openings 5g and 5h, near its shorter edges, in which the frame bottom surface 5f is not formed. The openings 5g and 5h each are a space in which, for example, an antenna or the like connected to the circuit board 6 is disposed. That is, in this embodiment, an antenna is disposed in the opening 5g or 5h so that the display holding frame 5, which is made of a metal, less affects the antenna characteristics.

Figure 8:
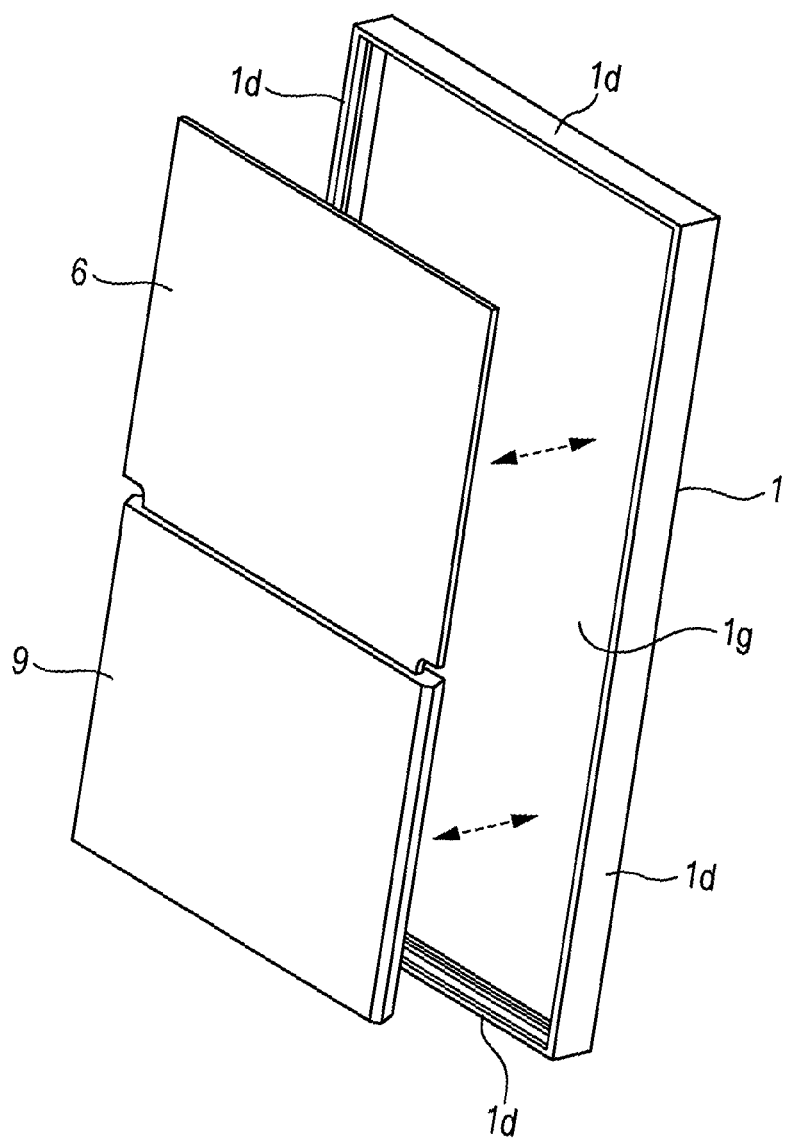
FIG. 8 is a perspective exploded perspective view of a case, a circuit board, and a battery pack included in the mobile information terminal in the embodiment of the present invention.

The case 1 of the mobile information terminal in this embodiment accommodates the circuit board 6, battery pack 9, and the like as illustrated in FIG. 8.

Figure 9:
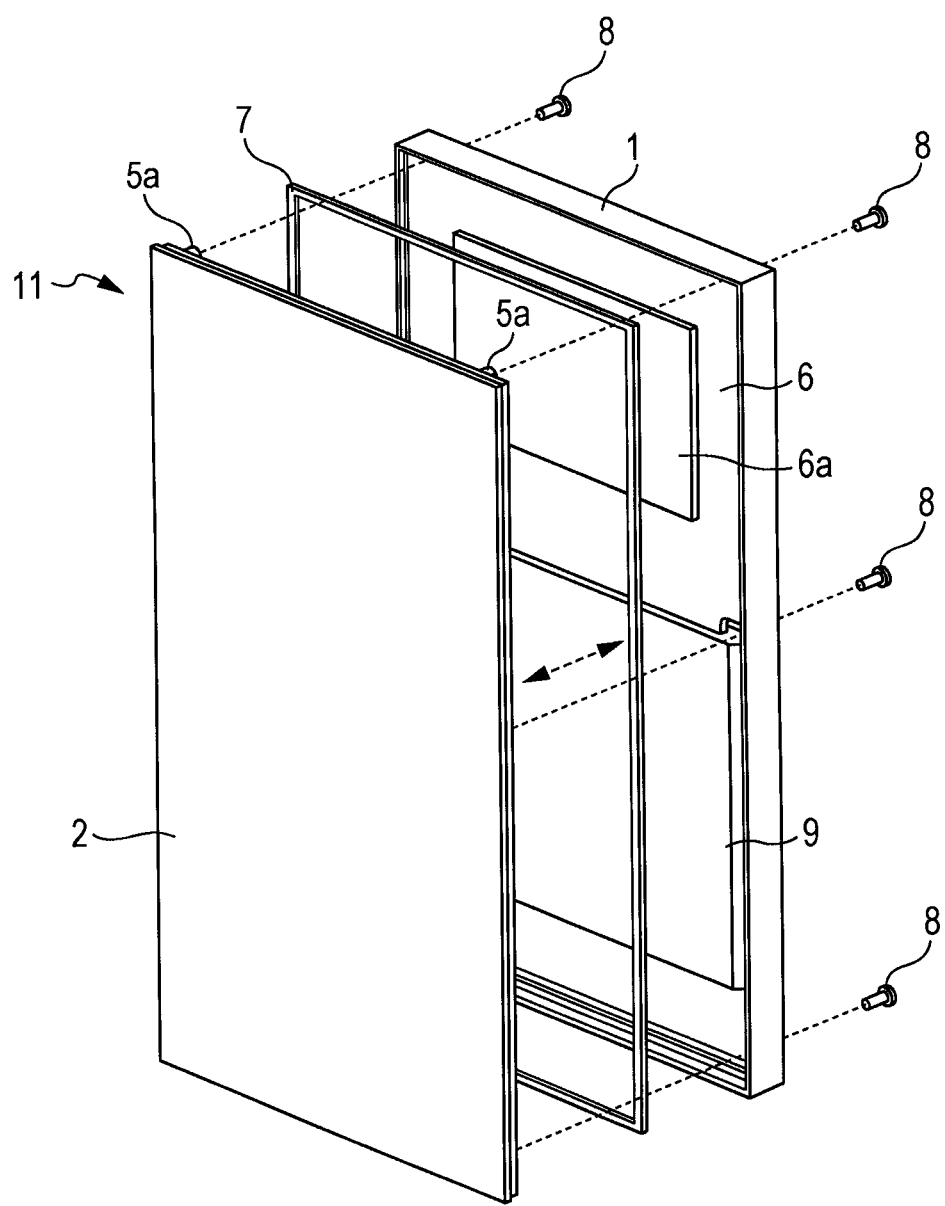
FIG. 9 is a perspective exploded perspective view of the case in which a display unit, a waterproof sheet, the circuit board, and the battery pack, which are included in the mobile information terminal in the embodiment of the present invention, have been incorporated.

As illustrated in FIG. 9, the mobile information terminal in this embodiment is formed by incorporating the display unit 11 into the case 1, in which the circuit board 6, battery pack 9, and the like have been incorporated, with the bolts 8 as described above. At that time, the waterproof sheet 7 is inserted between the case 1 and the display unit 11, and the waterproof sheet 7 is interposed between the frame rear surface-side outer circumferential part 5d of the display holding frame 5 and the frame outer circumference placing part is of the case 1, as described above.

[Other Functions of the Display Holding Frame and the Like]

In addition to the function, as described above, of holding the display module 10, the display holding frame 5 has, for example, an electromagnetic wave shield function for electronic parts mounted on the circuit board 6 and a heat dissipating function (heat diffusing function) for the electronic parts.

Figure 10:
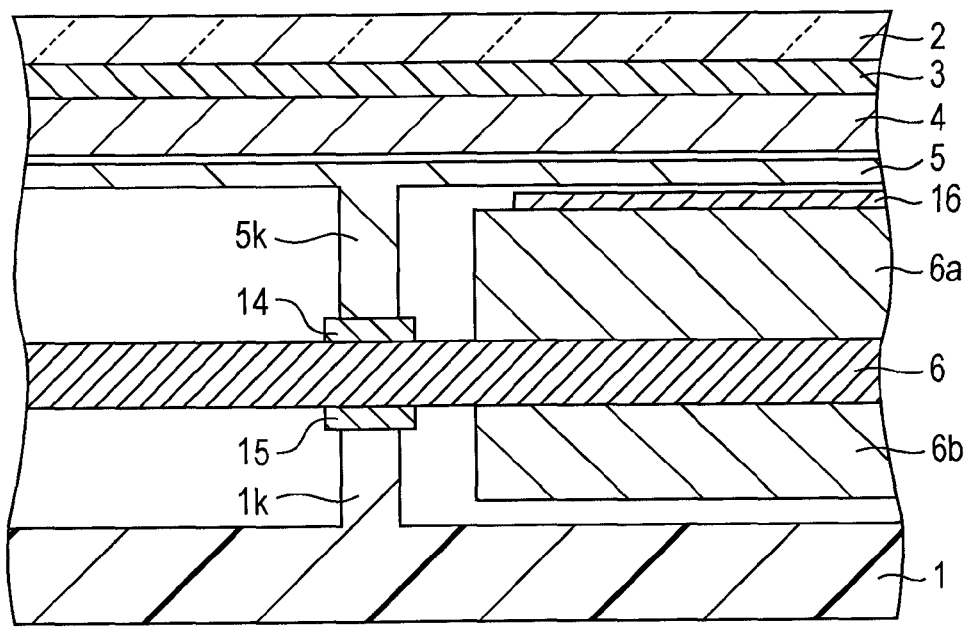

That is, the display holding frame 5 has a frame part (referred to below as a frame-side electronic part covering frame part 5k) that encloses and covers an electronic part 6a on the circuit board 6, as illustrated in FIG. 10, as a structure that implements the electromagnetic wave shield function and heat dissipating function (heat diffusing function). The frame-side electronic part covering frame part 5k is disposed at a position on the frame rear surface 5e of the display holding frame 5 at which the frame-side electronic part covering frame part 5k encloses and covers the electronic part 6a on the circuit board 6 when the display unit 11 is incorporated into the case 1 together with the circuit board 6. The frame-side electronic part covering frame part 5k has walls, the height of which is slightly larger than the maximum height from the board surface of the electronic part 6a on the circuit board 6; the walls are formed so as to enclose the electronic part 6a without a clearance. Although the walls have a rectangular shape, this is of course an example: if the walls are shaped so that they can enclose the electronic part 6a without a clearance, they may have a polygonal, circular, or elliptical shape other than the rectangular shape or may have another shape according to the placement of the electronic part 6a.

Thus, since, as for the mobile information terminal in this embodiment, the electronic part 6a on the circuit board 6 is enclosed and covered with the frame-side electronic part covering frame part 5k formed on the display holding frame 5, which is made of a metal or the like, without a clearance, it is possible to shut off electromagnetic noise emitted from the electronic part 6a, which would otherwise be released to the outside, and to shut off external electromagnetic noise and prevent the electronic part 6a from being adversely affected.

In this embodiment, a structure similar to the frame-side electronic part covering frame part 5k disposed on the display holding frame 5 can also be provided, for example, on same side as the case 1. That is, if the circuit board 6 is a double-sided board, for example, the case 1 has a frame part (referred to below as a case-side electronic part covering frame part 1k) that encloses and covers an electronic part 6b mounted on the same side as the case 1. The case-side electronic part covering frame part 1k is disposed at a position on the case bottom surface 1g of the case 1 at which the case-side electronic part covering frame part 1k encloses and covers the electronic part 6b on the case side on the circuit board 6 when the circuit board 6 is incorporated into the case 1. The case-side electronic part covering frame part 1k has walls, the height of which is slightly larger than the maximum height from the board surface of the electronic part 6b mounted on the circuit board 6; the walls are formed so as to enclose the electronic part 6b without a clearance. Although the walls have a rectangular shape, this is only an example as in the case of the frame-side electronic part covering frame part 5k: if the walls are shaped so that they can enclose the electronic part 6b without a clearance, they may have a polygonal, circular, or elliptical shape other than the rectangular shape or may have another shape according to the placement of the electronic part 6b.

Thus, since, as for the mobile information terminal in this embodiment, when the circuit board 6 is a double-sided board, the case-side electronic part covering frame part 1k similar to the frame-side electronic part covering frame part 5k is also provided on the same side as the case 1 made of, for example, a metal and the case-side electronic part covering frame part 1k encloses and covers the electronic part 6b on the circuit board 6 without clearance, it is possible to shut off electromagnetic noise as described above.

Furthermore, as for the mobile information terminal in this embodiment, it is also possible to place a shield auxiliary sheet 14 between the wall end of the frame-side electronic part covering frame part 5k and the board surface of the circuit board 6 and similarly place a shield auxiliary sheet 15 between the wall end of the case-side electronic part covering frame part 1k and the board surface of the circuit board 6.

The shield auxiliary sheet 14 is formed with a material that can shut off electromagnetic waves; the shield auxiliary sheet 14 has substantially the same shape as, for example, a ring shape formed by the wall end of the frame-side electronic part covering frame part 5k and has a slightly larger thickness than the width of a clearance between the frame-side electronic part covering frame part 5k and the board surface of the circuit board 6. Similarly, the shield auxiliary sheet 15 is formed with a material that can shut off electromagnetic waves; the shield auxiliary sheet 15 has substantially the same shape as a ring shape formed by the wall end of the case-side electronic part covering frame part 1k and has a larger thickness than the width of a clearance between the case-side electronic part covering frame part 1k and the board surface of the circuit board 6.

That is, the shield auxiliary sheet 14 is provided to shut off electromagnetic waves that pass through the clearance between the frame-side electronic part covering frame part 5k and the circuit board 6, and the shield auxiliary sheet 15 is similarly provided to shut off electromagnetic waves that pass through the clearance between the case-side electronic part covering frame part 1k and the circuit board 6. Thus, the mobile information terminal in this embodiment completely prevents leakage of electromagnetic waves by the use of the shield auxiliary sheets 14 and 15.

As for the mobile information terminal in this embodiment, it is also possible to place a heat dissipating sheet (heat diffusing sheet) 16 between the frame rear surface 5e of the display holding frame 5 and the electronic part 6a of the circuit board 6.

The heat dissipating sheet 16, having a high heat diffusing property and heat dissipating property and also having non-conductivity, is placed in contact with the electronic part 6a mounted on the circuit board 6 and with the frame rear surface 5e of the display holding frame 5. Accordingly, heat generated from the electronic part 6a is transmitted through the heat dissipating sheet 16 to the display holding frame 5, after which the heat is further transmitted from the display holding frame 5 to the case 1 and exhausted to the outside. It is desirable to place another heat dissipating sheet between the case bottom surface 1g of the case 1 and the electronic part 6b on the circuit board 6 as well.

[Example of Assembling the Mobile Information Terminal having the Electromagnetic Wave Shield Function and Heat Dissipating Function]

Figure 11:
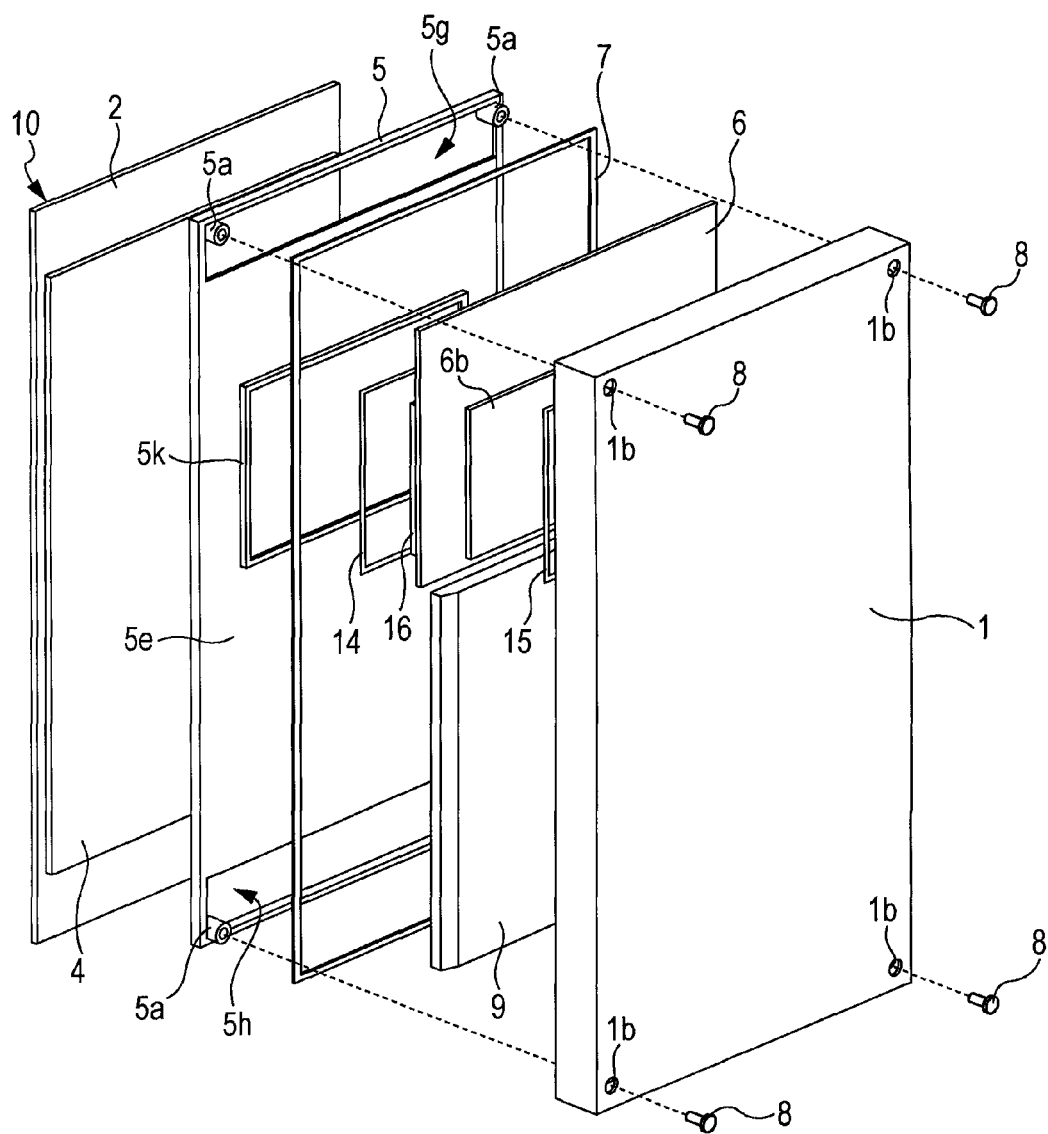
FIG. 11 is a perspective view of the structure in the range from the display unit to the case, as viewed from the rear surface of the case, illustrating an example of assembling the mobile information terminal, in the embodiment of the present invention, which has the electromagnetic wave shield and heat dissipating function.
Figure 12:
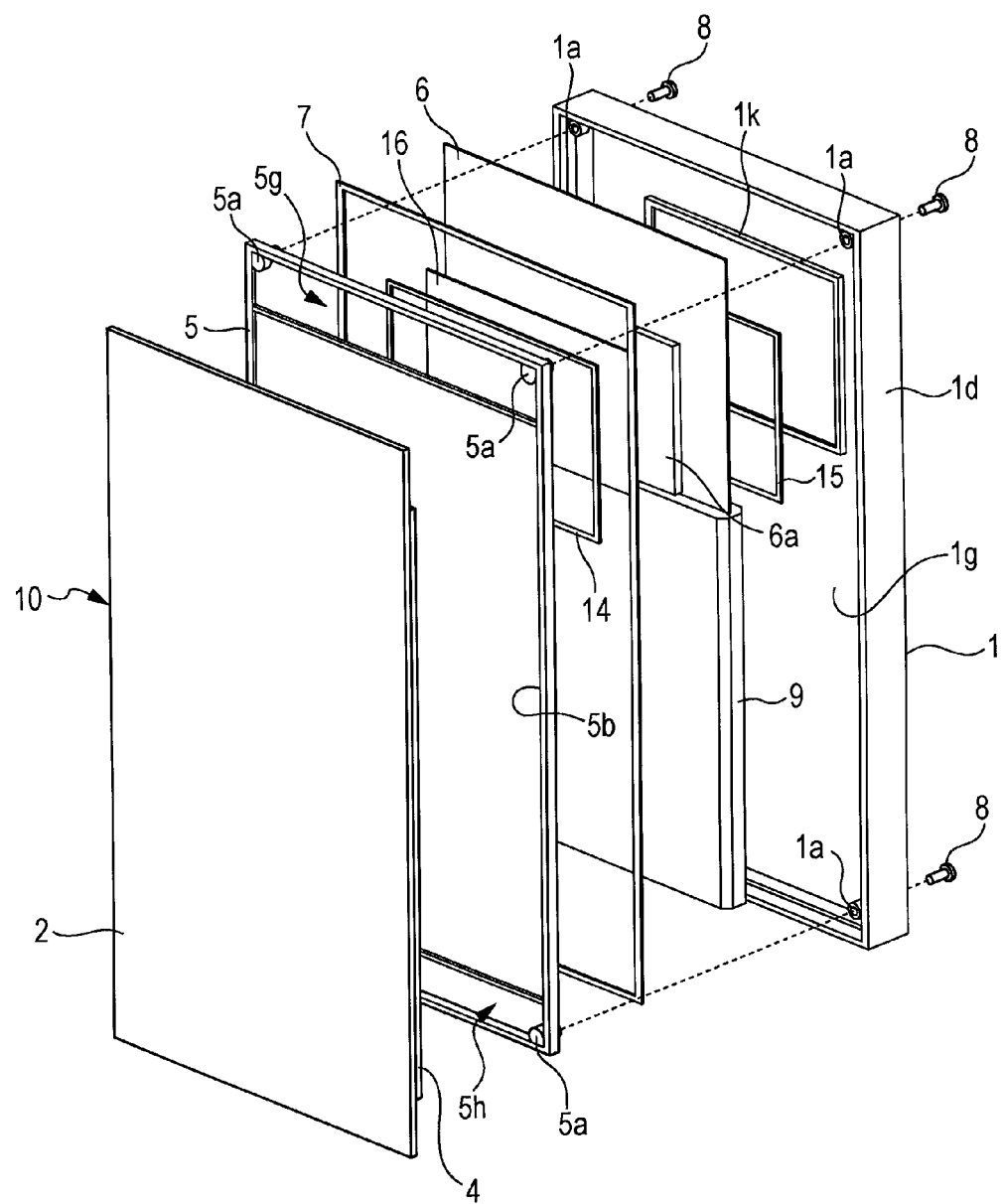
FIG. 12 a perspective view as viewed from the window glass of the display unit, illustrating an example of assembling the mobile information terminal, in the embodiment of the present invention, which has the electromagnetic wave shield and heat dissipating function.

FIGS. 11 and 12 illustrate an example of assembling the mobile information terminal having the electromagnetic wave shield function and heat dissipating function described above. FIG. 11 is a perspective view of the structure in the range from the display unit 11 to the case 1, as viewed from the rear surface of the case 1. FIG. 12 a perspective view as viewed from the window glass 2 of the display unit 11. In FIGS. 11 and 12, the assembling of the display unit 11, case 1, circuit board 6, and battery pack 9 is the same as in FIGS. 6 to 8, so its description will be omitted.

As illustrated in FIGS. 11 and 12, as for the mobile information terminal in this embodiment, the frame-side electronic part covering frame part 5k is assembled at a position at which the frame-side electronic part covering frame part 5k encloses and covers the electronic part 6a on the circuit board 6, and the shield auxiliary sheet 14 is placed between the wall end of the frame-side electronic part covering frame part 5k and the board surface of the circuit board 6. In addition, as for the mobile information terminal in this embodiment, the case-side electronic part covering frame part 1k is assembled so as to enclose and cover the electronic part 6b on the circuit board 6, and the heat dissipating sheet 15 is placed between the wall end of the case-side electronic part covering frame part 1k and the board surface of the circuit board 6. Furthermore, as for the mobile information terminal in this embodiment, a heat dissipating sheet 16 is placed and assembled between the frame rear surface 5e of the display holding frame 5 and the electronic part 6a of the circuit board 6.

Figure 13:
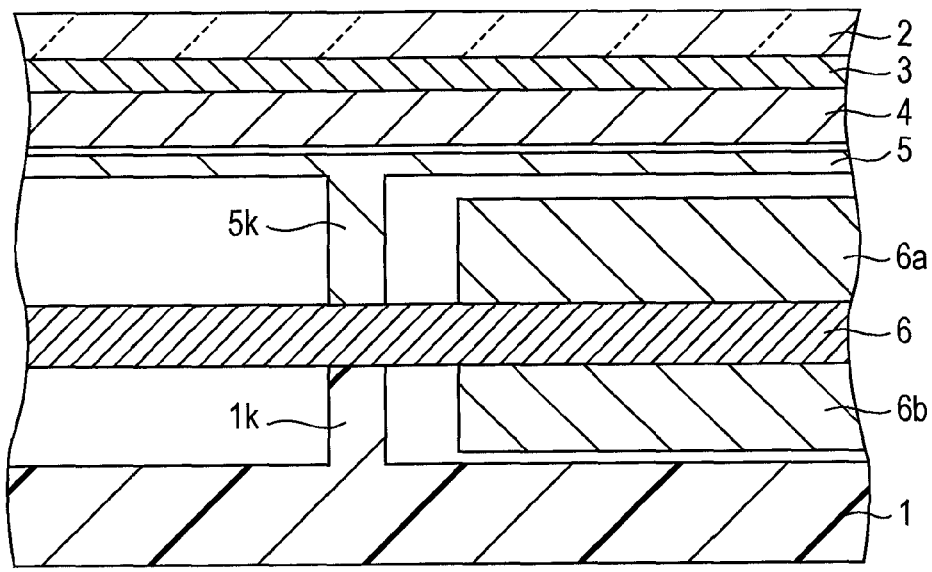
FIG. 13 is a schematic cross sectional view of the mobile information terminal, in the embodiment of the present invention, which lacks a shield auxiliary sheet and a heat dissipating sheet.

Although, in the example of the structure in FIG. 10, the shield auxiliary sheets 14 and 15 and the heat dissipating sheet 16 have been provided, if, for example, there is almost no clearance between the wall end of the frame-side electronic part covering frame part 5k and the board surface of the circuit board 6 and between the wall end of the case-side electronic part covering frame part 1k and the board surface of the circuit board 6 and similarly there is almost no clearance between the frame rear surface 5e of the display holding frame 5 and the electronic part 6a on the circuit board 6, a structure, as illustrated in FIG. 13, that lacks the shield auxiliary sheets 14 and 15 and the heat dissipating sheet 16 may be used. That is, the structure in FIG. 13 illustrates an example in which the shield auxiliary sheets 14 and 15 and the heat dissipating sheet 16 are eliminated to further thin the mobile information terminal.

Figure 14:
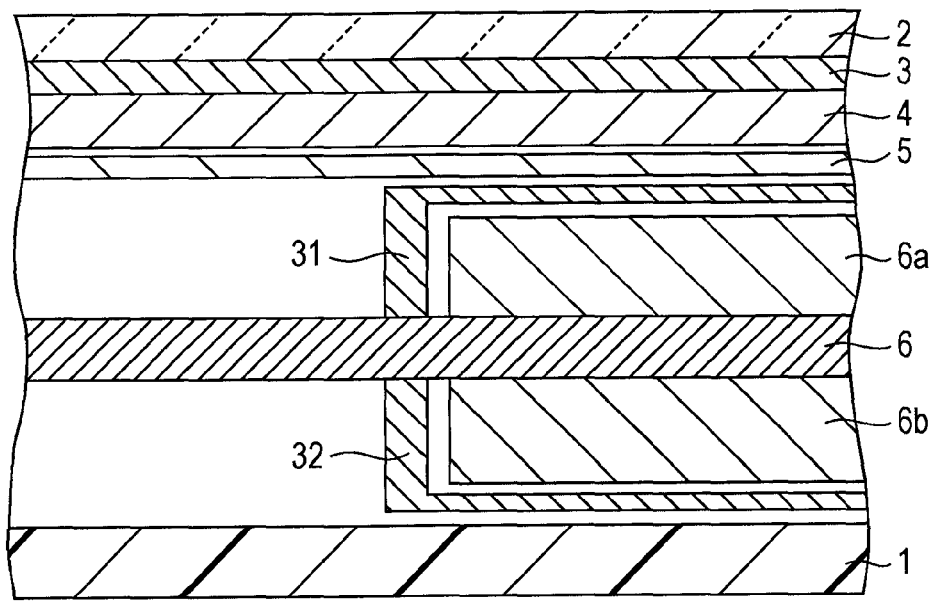
FIG. 14 is a schematic cross sectional view of a mobile information terminal as a comparative example, of the structures in FIGS. 10 and 13, in which an electronic part covering part is provided independently of the display holding frame and case.

FIG. 14 is a schematic cross sectional view of a mobile information terminal as a comparative example, of the structures in FIGS. 10 and 13, in which the electronic parts 6a and 6b are respectively covered by electronic part covering parts 31 and 32 provided independently of the display holding frame 5 and case 1. In the example of the structure illustrated in FIG. 14, the electronic part covering parts 31 and 32 must be separately prepared as dedicated shielding parts and additional man-hours taken to incorporate the separately prepared electronic part covering parts 31 and 32 are required, so the cost of the mobile information terminal may be increased and the thickness of the mobile information terminal may be increased by an amount equal to the heights of the separately structured electronic part covering parts 31 and 32. By comparison, in the structures in FIGS. 10 and 13, dedicated separate parts as in the example in FIG. 14 are not necessary, so cost reduction can be achieved by eliminating the costs of the parts and the man-hours, and the thickness of the mobile information terminal can also be reduced.

[Effects by the Use of the Structure of the Mobile Information Terminal in this Embodiment]

As described above, as for the mobile information terminal in this embodiment, the display unit 11 is formed in such a way that the display module 10 formed by integrating the components from the window glass 2 to the display panel 4 is further held and secured by the display holding frame 5. The display holding frame 5 of the display unit 11 can be screwed to the case 1 with the bolts 8. Since, as for the mobile information terminal in this embodiment, the display unit 11 is secured to the case 1 through a mechanical structure in which the bolts 8 and like are used, the display unit 11 can be firmly secured to the case 1 as compared with a structure as used in, for example, the conventional mobile information terminal, in which the window glass and the display panel are held with only a double-sided adhesive tape.

Accordingly, the mobile information terminal in this embodiment does not need the double-sided adhesive tape used in the conventional mobile information terminal, and thereby does not need the size in the tape width direction of the double-sided adhesive tape, so the terminal frame width ARW can be extremely reduced (the frame can be narrowed). That is, as for the mobile information terminal in this embodiment, it is possible to increase the ratio of the effective display area ACA of the display panel to the front-side projection size of the mobile information terminal; in other words, the display screen size can be more increased, enabling the amount of displayed information to be increased. Yet, as for the mobile information terminal in this embodiment, it is possible to suppress the front-side projection size of the terminal from being enlarged, so superior portability and maneuverability can be maintained.

In this embodiment, since the bolts 8 are used to secure the display unit 11 to the case 1, the display unit 11 can be easily detached from the case 1 by removing the bolts 8 and can also be easily attached again; the attachment and detachment can be repeated any number of times.

Accordingly, parts in the mobile information terminal in this embodiment can be easily repaired, for example, and the mobile information terminal can be easily discarded, enabling the cost to be reduced.

Furthermore, in the mobile information terminal in this embodiment, the display holding frame 5 is a part placed in the case 1 and is not exposed to the outside; only the case 1 and the like are exposed to the outside and thereby design providing a sense of unity can be achieved.

Since the mobile information terminal in this embodiment has the waterproof sheet 7, it can assure waterproof property.

As a frame structure that encloses the electronic part 6a, the mobile information terminal in this embodiment has the frame-side electronic part covering frame part 5k on the same side of the display holding frame 5 as the circuit board 6 made of a metal. As a frame structure that encloses the electronic part 6b, the mobile information terminal in this embodiment similarly has the case-side electronic part covering frame part 1k on the same side of the case 1 as the circuit board 6 made of a metal. The mobile information terminal in this embodiment has the shield auxiliary sheet 14 or the like between, for example, the circuit board 6 and the wall end of the frame-side electronic part covering frame part 5k on the same side as the circuit board 6 and also has the shield auxiliary sheet 15 or the like between, for example, the circuit board 6 and the wall end of the case-side electronic part covering frame part 1k on the same side as the circuit board 6.

Accordingly, the mobile information terminal in this embodiment can shut off an electromagnetic wave noise. That is, the mobile information terminal in this embodiment does not require dedicated shield parts as, for example, separate parts, so its thickness can be reduced accordingly, so it becomes possible to mount an electronic part having a higher placement height from the circuit board 6 or to thin the terminal body, for example. Since in this embodiment, dedicated shield parts, which are separate parts, become unnecessary, the number of parts can be reduced.

In addition, since in the mobile information terminal in this embodiment, the heat dissipating sheet 16 is placed between the electronic part 6a on the circuit board 6 and the display holding frame 5, it is possible to efficiently diffuse heat generated by the electronic part 6a on the circuit board 6 through the heat dissipating sheet 16 to the display holding frame 5. Of course, a similar heat dissipating sheet can also be placed between the case 1 and the electronic part 6b on the circuit board 6.

[Generalization]

As described above, the mobile information terminal in an embodiment of the present invention is structured with a display module 10, a display holding frame 5, a case 1, and bolts 8. The display module 10 is formed by laminating a sheet of window glass 2, a touch panel 3, and a display holding frame 5. The display holding frame 5 holds and secures the display module 10 from the rear surface of the display module 10, the rear surface being opposite to the display surface of a display panel 4. The display holding frame 5 has screw accepting parts (internally threaded parts 5a) on its rear surface side opposite to the display panel 4. The case 1, which internally accumulates the display holding frame 5, has screw holes (through-holes 1a and countersunk parts 1b) corresponding to the screw accepting parts of the display holding frame 5. Each bolt 8 is screwed into the screw accepting part of the display holding frame 5, to which the display module 10 has been secured, through a screw hole in the case 1 to secure the display holding frame 5, to which the display module 10 has been secured, to the case 1.

In the mobile information terminal in the embodiment of the present invention, the case 1 has a frame outer circumference placing part 1c on which the outer circumference of the rear surface of the display holding frame 5 is placed, and the waterproof sheet 7 is interposed between the outer circumferential part of the rear surface of the display holding frame 5 and the frame outer circumference placing part 1c of the case 1. The waterproof sheet 7 has a shape substantially matching a prescribed shape formed by the outer circumferential part of the rear surface of the display holding frame 5 and the frame outer circumference placing part 1c of the case 1, the waterproof sheet 7 having impermeability to at least moisture.

In the mobile information terminal in the embodiment of the present invention, together with the display holding frame part 5, the case 1 internally accommodates the circuit board 6. The display holding frame 5 is made of a metal material and has walls (frame-side electronic part covering frame part 5k) on the rear surface, the walls enclosing and covering the electronic part 6a on the circuit board 6.

The mobile information terminal in the embodiment of the present invention also has a conductive sheet (shield auxiliary sheet 14) between the board surface of the circuit board 6 and the wall end of the walls (frame-side electronic part covering frame part 5k) of the display holding frame 5.

The mobile information terminal in the embodiment of the present invention also has a heat diffusing sheet (heat dissipating sheet 16) between the electronic part 6a on the circuit board 6 and the rear surface enclosed by the walls (frame-side electronic part covering frame part 5k) of the display holding frame 5.

In the mobile information terminal in the embodiment of the present invention, the case 1 is made of a metal material; together with the display holding frame 5, the case 1 internally accommodates the circuit board 6; the case 1 has walls (case-side electronic part covering frame part 1k) on a side on which the circuit board 6 is placed, the walls enclosing and covering the electronic part 6b on the circuit board 6.

Furthermore, the mobile information terminal in the embodiment of the present invention has a conductive sheet (shield auxiliary sheet 15) between the board surface of the circuit board 6 and the end of the walls (case-side electronic part covering frame part 1k) of the case 1.

The mobile information terminal having the structure described above in the embodiment of the present invention can increase the amount of displayed information by the use of a large screen, and can also maintain superior portability and maneuverability. In addition, the mobile information terminal in the embodiment of the present invention can shut down electromagnetic noise and can diffuse and exhaust heat generated by the electronic part.

The mobile information terminal in this embodiment can be applied not only to, for example, advanced mobile telephone terminals and tablet terminals or slate PCs but also to, for example, so-called personal digital assistants (PDAs), mobile game machines, mobile navigation terminals, and other various mobile information terminals.

The above description of the embodiment is just an example of the present invention. Accordingly, it will be appreciated that the present invention is not limited to the embodiment described above and variations and modifications are possible according to, for example, design without departing from the technical concept of the present invention.

It will be also understood by those skilled in the art that various modification and combinations and other embodiments may be derived from design or other elements within the range of the claims of the present invention or an equivalent range of the claims.

REFERENCE SIGNS LIST

1: case
1a: through-hole
1b: countersunk part
1c: frame outer circumference placing part
1d: case front-side outer circumferential wall
1g: case bottom surface
1k: case-side electronic part covering frame part
2: window glass
2a: window inner surface-side outer circumferential part
3: touch panel
4: display panel
4a: panel inside main plane
5: display holding frame
5a: internally threaded part
5b: display panel accepting part
5c: frame side wall
5d: frame rear surface-side outer circumferential part
5e: frame rear surface
5f: frame bottom surface
5k: frame-side electronic part covering frame part
6: circuit board
6a: display-side electronic part
6b: case-side electronic part
7: waterproof sheet
8: bolt
9: battery pack
10: display module
11: display unit
14, 15: shield auxiliary sheet
16: heat dissipating sheet

What is claimed is:

1. A terminal apparatus comprising:
a display module including a window glass, a touch panel, and a display panel, the window glass having a larger surface area than each of the touch panel and display panel;
a display holding frame that secures the display module, the display holding frame having a screw accepting part on a rear surface which is opposite to the display panel;
a cabinet case, which encloses the rear surface and an outer side surface of the display holding frame, and which has a screw hole corresponding to the screw accepting part of the display holding frame; and
a bolt or screw inserted into the screw accepting part of the display holding frame through the screw hole in the cabinet case,
wherein:
the cabinet case has a frame outer circumference placing part on which an outer circumferential part of the rear surface of the display holding frame is placed,
the terminal apparatus further comprises a waterproof sheet, having impermeability at least to moisture, is provided between the outer circumferential part of the rear surface of the display holding frame and the frame outer circumference placing part of the cabinet case, and
the screw accepting part is disposed between the waterproof sheet and a circuit board of the terminal apparatus,
wherein an interior surface of the window glass, which protrudes outward beyond an outer edge of each of the touch panel and display panel, is directly bonded to and overlaps the display holding frame on a front surface of a protruding portion of the display holding frame that is opposite to the outer circumferential part of the rear surface of the display holding frame, and an exterior surface of the window glass is substantially flush with a top edge of the cabinet case, and
wherein a width of a top surface of the terminal apparatus between an outer edge of the cabinet case and a start of an effective display area of the display module is a maximum of 3.15 mm.

2. The terminal apparatus according to claim 1, wherein the waterproof sheet is made of a silicon rubber sheet.

3. The terminal apparatus according to claim 1, wherein the waterproof sheet has a shape substantially matching a shape formed by the outer circumferential part of the rear surface of the display holding frame and the frame outer circumference placing part of the cabinet case.

4. The terminal apparatus according to claim 1, wherein the display holding frame and the cabinet case are configured to internally accommodate the circuit board, and the display holding frame is made of a metal material and has a wall formed on the rear surface, the wall enclosing and covering an electronic part on the circuit board.

5. The terminal apparatus according to claim 4, further comprising a conductive sheet placed between a board surface of the circuit board and an end of the wall of the display holding frame.

6. The terminal apparatus according to claim 5, wherein the conductive sheet is formed of a material that shuts off electromagnetic waves.

7. The terminal apparatus according to claim 4, further comprising a heat diffusing sheet placed between the electronic part on the circuit board and the rear surface enclosed by the wall of the display holding frame.

8. The terminal apparatus according to claim 7, wherein the heat diffusing sheet has a high heat diffusing property, a heat dissipating property, and is non-conductive.

9. The terminal apparatus according to claim 1, wherein the display holding frame and the cabinet case are configured to internally accommodate the circuit board, and the cabinet case is made of a metal material and has a wall formed on a side on which the circuit board is placed, the wall enclosing and covering the electronic part on the circuit board.

10. The terminal apparatus according to claim 9, further comprising a conductive sheet placed between a board surface of the circuit board and an end of the wall of the cabinet case.

* * * * *